(12) United States Patent
Yamamoto

(10) Patent No.: US 7,220,207 B2
(45) Date of Patent: May 22, 2007

(54) DIFFERENTIAL APPARATUS

(75) Inventor: Kenji Yamamoto, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 0 days.

(21) Appl. No.: 10/826,041

(22) Filed: Apr. 15, 2004

(65) Prior Publication Data

US 2004/0209723 A1    Oct. 21, 2004

(30) Foreign Application Priority Data

Apr. 18, 2003   (JP)   ............................. 2003-114410

(51) Int. Cl.
*F16H 48/00* (2006.01)
*B60K 17/16* (2006.01)

(52) U.S. Cl. ...................................... 475/150

(58) Field of Classification Search ............ 475/5, 475/6, 9, 150, 231; 180/65.6
See application file for complete search history.

(56) References Cited

U.S. PATENT DOCUMENTS

| | | | | |
|---|---|---|---|---|
| 2,397,357 A | * | 3/1946 | Kundig | ........................ 416/21 |
| 4,467,230 A | * | 8/1984 | Rovinsky | ....................... 310/83 |
| 4,729,258 A | * | 3/1988 | Mohri et al. | .................... 475/5 |
| 5,372,213 A | * | 12/1994 | Hasebe et al. | ............. 180/65.6 |
| 5,396,968 A | * | 3/1995 | Hasebe et al. | ............. 180/65.6 |
| 5,469,032 A | * | 11/1995 | Otake | .......................... 318/439 |
| 5,759,128 A | * | 6/1998 | Mizutani et al. | ............ 475/149 |
| 6,883,235 B2 | * | 4/2005 | Bell | ........................... 29/893.1 |
| 6,940,056 B2 | * | 9/2005 | Christofis et al. | ............ 219/635 |
| 2002/0165060 A1 | * | 11/2002 | Fleytman et al. | ............... 475/6 |

FOREIGN PATENT DOCUMENTS

| | | | |
|---|---|---|---|
| JP | 07156673 A | * | 6/1995 |
| JP | 9-229162 | | 9/1997 |
| JP | 2001132801 A | * | 5/2001 |

OTHER PUBLICATIONS

Translation of JP 09-229162 filed in applicant's information disclosure statement.*

* cited by examiner

*Primary Examiner*—Sherry Estremsky
(74) *Attorney, Agent, or Firm*—Morgan & Finnegan, L.L.P.

(57) ABSTRACT

The present invention relates to an improvement for a differential apparatus that transmits torque produced by a motor to two axle shafts. A motor output shaft portion is formed coaxially and integrally with a gear case.

3 Claims, 2 Drawing Sheets

DIFFERENTIAL APPARATUS

BACKGROUND OF THE INVENTION

The present invention relates to a differential apparatus for vehicles, and in particular, to a joining structure for an output shaft, which outputs torque produced by a driving source, and a differential case.

A differential apparatus for vehicles transmits torque produced by an engine to left and right axle shafts (wheel drive shafts), which respectively transmit the torque to left and right drive wheels. A conventional differential apparatus is disclosed, for example, in Japanese Laid-Open Patent Publication No. 9-229162. The conventional differential apparatus includes a gear case and a ring gear that are integrally formed from the same material. Such an integral structure eliminates the need for assembling the gear case and the ring gear. This improves productivity of the differential apparatus and prevents noise and vibrations, which are produced when the axis of the gear case is misaligned from the axis of the teeth in the ring gear.

FIG. 2 illustrates a differential apparatus 100 that transmits torque produced by a motor to left and right axle shafts. The differential apparatus 100 transmits torque produced by the motor 150, which includes a stator core 152 and a rotor core 154, to a left axle shaft 102 and a right axle shaft 104 while causing a rotational difference between the left axle shaft 102 and the right axle shaft 104. In more detail, the differential apparatus 100 includes a pair of side gears 106, each of which is arranged at one end of either the left axle shaft 102 or the right axle shaft 104. A pair of differential pinions 108 and a pinion shaft 110 are meshed with the pair of side gears 106 to automatically generate a rotational difference. The pinion shaft 110 extends through a gear case 112. With this structure, torque of a motor output shaft 156 is transmitted to the left axle shaft 102 and the right axle shaft 104. The differential apparatus 100 does not need to have a ring gear for transmitting torque from the motor output shaft 156 to the gear case 112. Therefore, the gear case 112 does not have to be assembled with a ring gear, and there are no problems caused by the assembled gear case 112 and ring gear.

One end of the motor output shaft 156 is inserted in the gear case 112 so that internal splines 114 formed around the outer surface of the motor output shaft 156 and external splines 116 formed around the inner surface of the gear case 112 are engaged with one another. This means that the gear case 112, which is joined with the motor output shaft 156 by the internal and external splines 114 and 116, must be positioned at the same time as when the motor output shaft 156 is positioned. Moreover, when the machining accuracy of the internal and external splines 114 and 116 is not sufficient, the axis of the motor output shaft 156 and the axis of the gear case 112 may not be aligned with each other. This may produce noise and vibrations.

Further, the internal splines 114 and the external splines 116 occupy space in the axial direction of the motor 150 (see dimension H). This restricts the maximum size of the mountable motor 150.

SUMMARY OF THE INVENTION

It is an object of the present invention to provide a differential apparatus that involves a reduced number of assembly operations, prevents noise and vibrations, and accommodates a larger motor.

To achieve the above object, the present invention provides a differential apparatus for transmitting torque from an output shaft of a driving source to two axle shafts while producing a rotational difference between the two axle shafts. The differential apparatus includes a differential case coaxially and integrally joined with the output shaft.

A further aspect of the present invention is a differential apparatus, arranged between two axle shafts, for rotating the two axle shafts at different speeds or at the same speed. The differential apparatus includes differential gears for connecting the two axle shafts to each other, an output shaft member having a differential case portion for accommodating the differential gears and an output shaft portion integrally formed with the differential case portion from the same material, and a driving source that supplies the output shaft member with torque.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
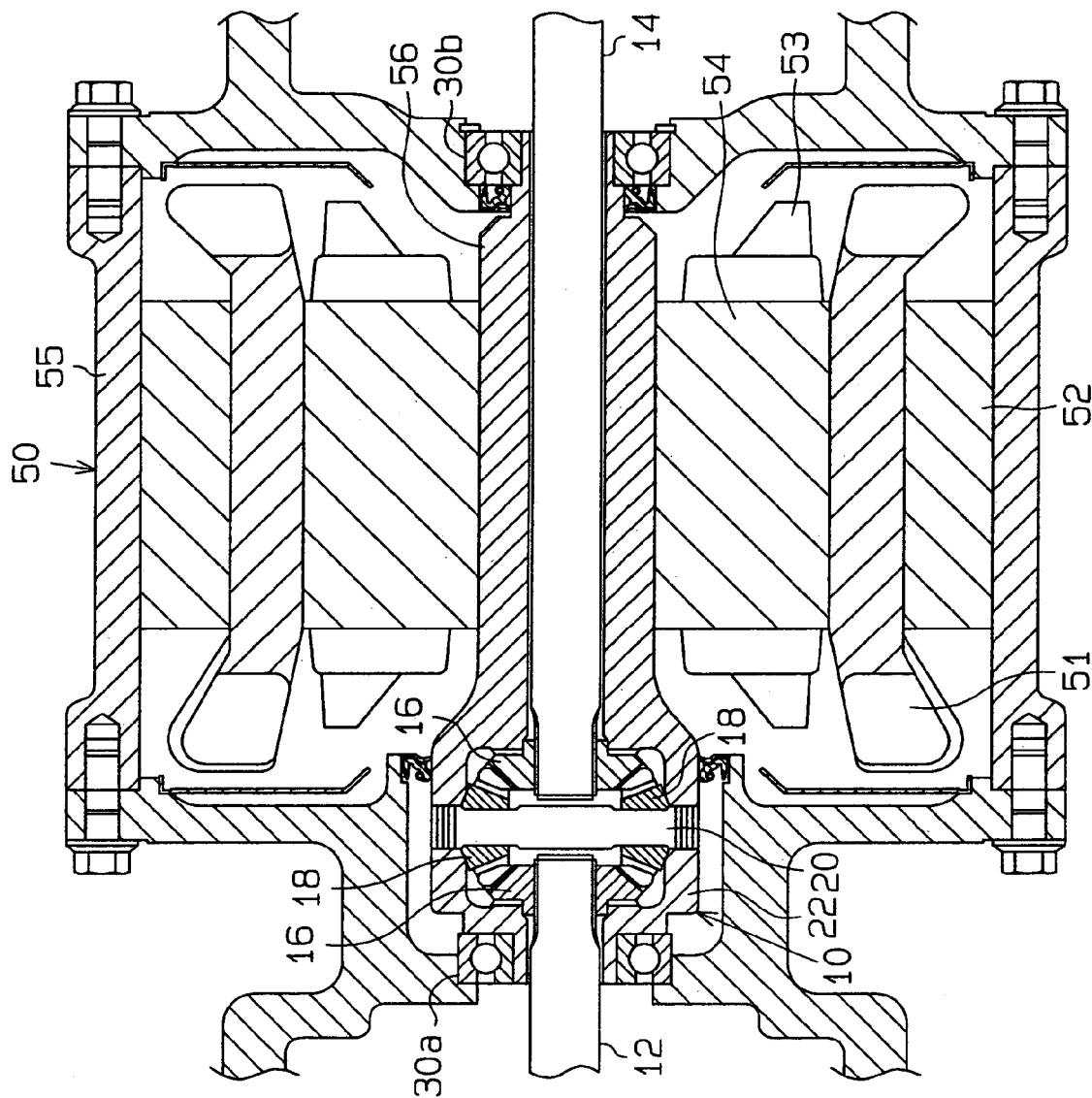
FIG. 1 is a cross-sectional diagram of a differential apparatus according to a preferred embodiment of the present invention.

FIG. 1 is a cross-sectional diagram of a differential apparatus 10 according to a preferred embodiment of the present invention.

The differential apparatus 10 is mounted, for example, on a battery-operated forklift and transmits torque produced by a motor 50 to a left axle shaft 12 and a right axle shaft 14. The left axle shaft 12 and the right axle shaft 14 are connected to a left front wheel and a right front wheel of the forklift, respectively. The differential apparatus 10 absorbs the rotational difference produced between the left and right wheels when the forklift turns.

The motor 50 is, for example, a three-phase induction motor that produces torque when energized. The motor 50 includes a stator, a rotor, and a cylindrical motor case 55. The stator produces a rotating magnetic field and includes a stator coil 51 and a stator core 52. The rotor, through which secondary current is conducted, includes a rotor conductor 53 and a rotor core 54. The motor case 55 accommodates the stator and the rotor. Torque produced by the motor 50 is output by a cylindrical motor output shaft portion 56. The right axle shaft 14 rotatably extends through the motor output shaft portion 56.

A side gear 16 is arranged on one end of each of the left axle shaft 12 and the right axle shaft 14. A pair of upper and lower differential pinions 18 meshes with the pair of side gears 16. A pinion shaft 20, to which the differential pinions 18 are fixed, rotates to generate a rotational difference. The pinion shaft 20 extends through a gear case portion 22. The torque of the motor output shaft portion 56 is transmitted to the left axle shaft 12 and the right axle shaft 14 by the gear case portion 22.

The following describes a mechanism for generating the rotational difference with the differential apparatus 10 in detail. When the upper and lower differential pinions 18 are not rotating, the torque of the motor output shaft portion 56 is transmitted to the left axle shaft 12 and the right axle shaft 14 by the side gears 16, the differential pinions 18, and the pinion shaft 20. This rotates the axle shafts 12 and 14 at the same speed and the same direction as the motor output shaft portion 56. When the differential pinions 18 are rotated in one direction, the left axle shaft 12 and the right axle shaft 14 rotate in opposite directions relative to each other. In this case, as a whole, in the differential apparatus 10, the torque of the motor output shaft portion 56 is transmitted to the left axle shaft 12 and the right axle shaft 14 by the side gears 16, the differential pinions 18, and the pinion shaft 20 so as to cause the axle shafts 12 and 14 to rotate at a different speed but in the same direction as the motor output shaft portion 56. In this manner, the differential apparatus 10 generates a rotational difference corresponding to a torque difference between the left and right wheels acting on the left axle shaft 12 and the right axle shaft 14.

The motor output shaft portion 56 and the gear case portion 22 of the differential apparatus 10 are integrally cast with each other to form a single output shaft member. Such an integral structure eliminates the need for joining the motor output shaft 156 and the gear case 112 with the splines 114 and 116 as in the prior art example of FIG. 2. Further, the need for machining and connecting the joining portions of the motor output shaft 156 and the gear case 112 is eliminated. This reduces the manufacturing cost of the differential apparatus 10. The motor output shaft portion 56 and the gear case portion 22 are made of a material that may be cast, such as cast iron, and preferably, cast iron material having high ductility and high mechanical strength, such as ductile cast iron (FCD).

The output shaft member having the motor output shaft portion 56 and the gear case portion 22 is supported in a smoothly rotatable manner by two bearings 30a and 30b. The bearing 30a is arranged adjacent to the gear case portion 22, and the bearing 30b is arranged on one end of the motor output shaft portion 56. The motor output shaft portion 56 and the gear case portion 22 are integrally cast with each other so that their axes are aligned with each other. Accordingly, the laborious process of aligning the rotation axes of the motor output shaft portion 56 and the gear case portion 22 with each other is not required when the output shaft member is attached to the bearings 30a and 30b. Further, the motor output shaft portion 56 and the gear case portion 22 remain coaxial even when the motor 50 generates high speed rotation. Thus, noise, vibrations, or frictional heat that would otherwise be caused by the motor output shaft portion 56, the gear case portion 22, and the bearings 30a and 30b are not produced.

Figure 2:
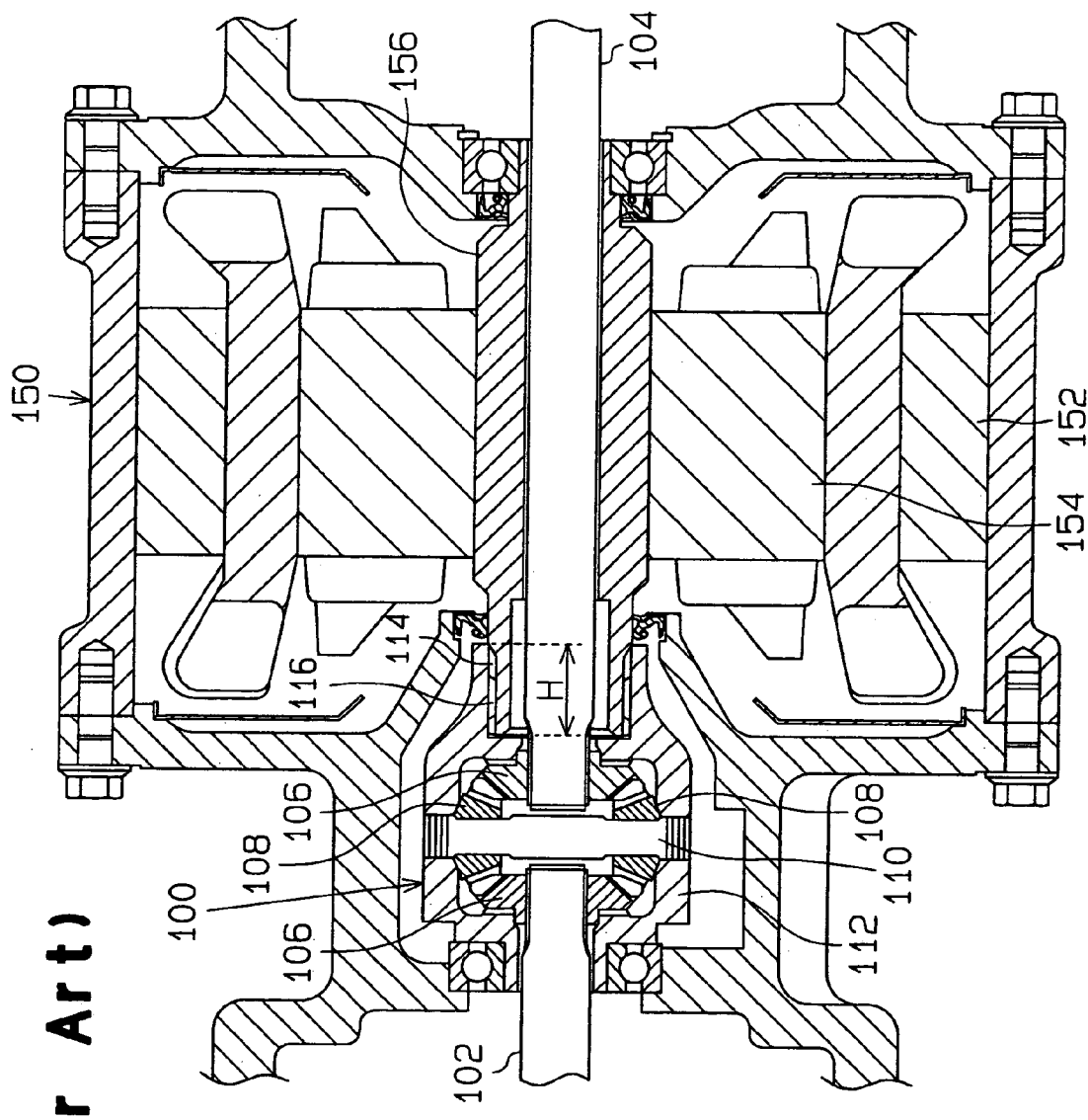
FIG. 2 is a cross-sectional diagram of a conventional differential apparatus.

In the prior art example of FIG. 2, however, the rotation axis of the motor output shaft 156 and the rotation axis of the gear case 112 need to be precisely aligned with each other when the motor output shaft 156 and the gear case 112 are attached to two bearings. Without the precise alignment, the axes of the motor output shaft 156 and the gear case 112 may be misaligned from each other. This would produce noise, vibration, or frictional heat between the motor output shaft 156, the gear case 112 and the two bearings when the motor 150 generates high speed rotation.

The differential apparatus 10 does not require the splines 114 and 116 to be formed. Thus, there is no spatial limitation in the axial direction of the motor in relation with dimension H in FIG. 2. This enables the size of the motor 50 to be increased compared with the prior art example of FIG. 2. As a result, a larger space may be provided for the stator coil 51 to increase the output of the motor 50.

It should be apparent to those skilled in the art that the present invention may be embodied in many other specific forms without departing from the spirit or scope of the invention. Particularly, it should be understood that the present invention may be embodied in the following forms.

Although the above embodiment describes an example in which the motor output shaft portion 56 and the gear case portion 22 are cast integrally with each other, the present invention is not limited to such a structure. For example, the motor output shaft portion 56 and the gear case portion 22 may be manufactured separately, and then integrally joined with each other through welding or the like with their rotation axes being aligned with each other. In other words, it is only required that a single integral member be used to function as the motor output shaft portion 56 and the gear case portion 22.

Although the above embodiment describes an example in which the motor output shaft portion 56 and the motor 50 are directly connected to each other, the present invention is not limited to such a structure. For example, the present invention is applicable to a case in which one or more transmission gears are provided between the motor 50 and the motor output shaft portion 56.

The power source that produces torque for rotating the axle shafts may be a gasoline engine or a diesel engine instead of the motor 50.

Although the present invention is applied to the differential apparatus 10, which is used for a front-wheel drive battery-operated forklift in the preferred embodiment, the present invention is not limited to such a structure. For example, the present invention may be applied to a differential apparatus used in a rear-wheel drive vehicle, such as another type of an industrial vehicle or an automobile.

The present examples and embodiments are to be considered as illustrative and not restrictive, and the invention is not to be limited to the details given herein, but may be modified within the scope and equivalence of the appended claims.

What is claimed is:

1. A differential apparatus, arranged between two axle shafts, for rotating the two axle shafts at different speeds or at the same speed, the differential apparatus comprising:
   differential gears for connecting the two axle shafts to each other;
   an output shaft member having a differential case portion for accommodating the differential gears and an output shaft portion integrally formed with the differential case portion from the same material, wherein the output shaft member is a single and monolithic cast member;
   a driving source that supplies the output shaft member with torque,
   wherein the driving source is a motor;
   a motor case for accommodating the motor; and
   two bearings that support the output shaft member in a manner rotatable with respect to the motor case, one of the bearings being arranged on one end of the output shaft portion and the other one of the bearings being arranged on one end of the gear case portion opposite to the output shaft portion.

2. The differential apparatus according to claim 1, wherein the output shaft member is made of cast iron.

3. The differential apparatus according to claim 1, wherein the two axle shafts are linked to two drive wheels of an industrial vehicle, respectively.

* * * * *